Nov. 25, 1969  R. V. POLE  3,480,875
LASER SCANNING DEVICE HAVING TWO LENS SYSTEMS
WITH A COMMON FOCAL PLANE
Filed Dec. 6, 1965
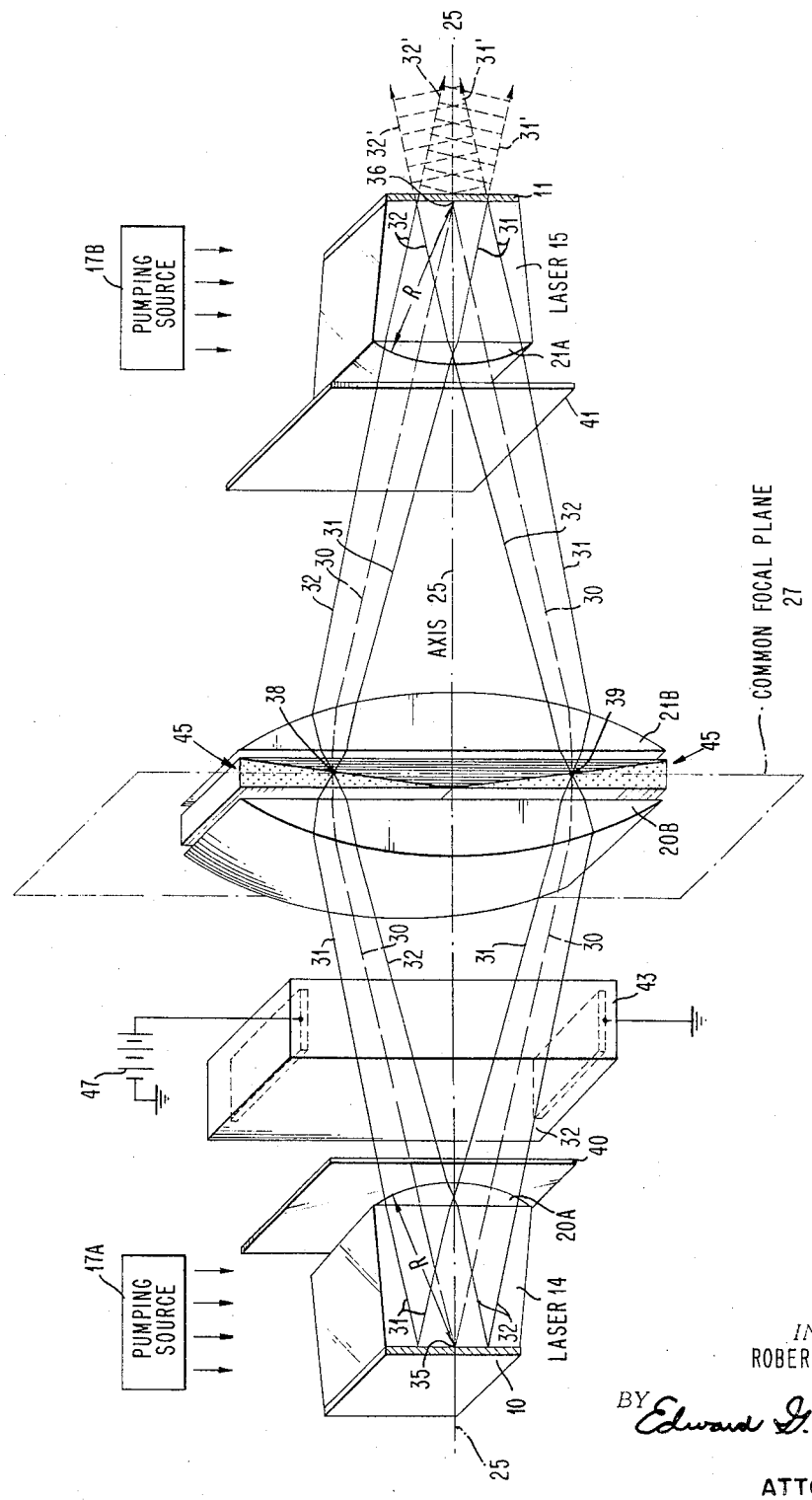
INVENTOR.
ROBERT V. POLE
BY Edward G. Fiorito
ATTORNEY United States Patent Office 3,480,875
Patented Nov. 25, 1969

3,480,875
LASER SCANNING DEVICE HAVING TWO LENS SYSTEMS WITH A COMMON FOCAL PLANE
Robert V. Pole, Yorktown Heights, N.Y., assignor to International Business Machines Corporation, Armonk, N.Y., a corporation of New York
Filed Dec. 6, 1965, Ser. No. 511,841
Int. Cl. H01s 3/02
U.S. Cl. 331—94.5                             7 Claims

ABSTRACT OF THE DISCLOSURE

A laser cavity is set up between a pair of plane mirrors. At least one active laser element is located between the mirrors. A pair of lens systems are positioned between the mirrors so that they have a common focal plane located between them. A Kerr cell, polarizers, and a compensator suppress light oscillations along certain reflection paths within the cavity, thereby setting up preferred modes of oscillation along other paths. Laser emission occurs along the preferred paths. Rays of light diverging from points along the common focal plane are converged into parallel rays by the lens systems before striking the mirrors. After reflection by the mirrors, the parallel rays are once again converged by the lens systems into points on the common focal plane. Therefore, the only focused, high energy laser light in the cavity occurs along the common focal plane rather than at the location of mirrors.

---

Various laser cavities have been designed which control the direction of emission by setting up preferred paths of oscillation within the cavity. For example, the laser cavity in commonly assigned co-pending application Ser. No. 742,949, which is a continuation of application Ser. No. 332,617, now abandoned, includes many angularly degenerate modes of oscillation. Optical devices are inserted in the cavity for suppressing emission along all of the paths except one. Emission occurs along this preferred path. The direction of emission may be varied by changing the suppressed modes of oscillation within the cavity.

The laser cavity of the above co-pending application and others disclosed in commonly assigned co-pending applications Serial Nos. 413,704, now U.S. Patent No. 3,440,560, 414,120, now abandoned and 412,814 now abandoned employ reflecting surfaces upon which converging laser light impinges. The converging light has a high energy content which heats the reflecting surfaces. The amount of energy focused on the reflecting surface is thereby limited by the ability of the surface to withstand the concentrated heat and high electric fields of the coherent light.

It is an object of the present invention to provide a laser cavity wherein the direction of laser emission is controlled.

It is another object of the present invention to provide a laser cavity wherein the direction of laser emission is controlled without burning the reflecting surfaces of the cavity.

Still another object of the present invention is to provide a laser cavity capable of emitting a high energy laser beam and requiring simply constructed optical apparatus for controlling the direction of emission.

These and other objects of the present invention are accomplished by providing a laser cavity formed between a pair of plane mirrors. At least one active laser element, such as ruby, is located between the mirrors. Two lens systems are positioned between the mirrors so that they have a common focal plane located between them. Optical devices are located in the common focal plane for suppressing light oscillations along certain paths within the cavity, thereby setting up preferred paths of oscillation along which laser emission occurs.

In this manner, rays of light diverging from points along the common focal plane are converged into parallel rays by the lens systems before striking the reflecting mirrors. After being reflected by the mirrors, the parallel rays are once again converged by the lens systems into points on the common focal plane. Therefore, the only focused, high energy laser light in the cavity occurs along the common focal plane rather than at the location of the mirrors.

Since the mirrors are not subjected to focused high energy laser light, the power output of the cavity is not limited by the capacity of the mirrors to withstand heat. Another advantage of the present invention is the shape of the optical device controlling the position of the preferred paths of oscillation. This device is located in the common focal plane which has a flat planar shape. Therefore, no curved or other unconventionally shaped optical devices are needed to control the emission of the laser cavity.

The foregoing and other objects, features and advantages of the invention will be apparent from the following more particular description of a preferred embodiment of the invention, as illustrated in the accompanying drawing.

In the drawing:
FIG. 1 is a schematic illustrating a laser cavity embodying the present invention.

A laser cavity is formed in FIG. 1 between a pair of reflecting surfaces 10 and 11. Two active laser elements 14 and 15, typically ruby, are located adjacent to the surfaces 10 and 11, respectively. As shown in FIG. 1, the reflecting surfaces 10 and 11 are coated directly on the lasers 14 and 15. Other lasing media such as gas can be used in combination with passive lenses.

A pumping source, shown in two parts, 17A and 17B supplies light to the lasers 14 and 15 which set up resonant modes within the cavity at frequencies in the visible region of the spectrum. High energy coherene light is produced when the pumping source 17 supplies energy to the lasers 14 and 15 above a certain critical threshold. In accordance with the present invention, the direction of the laser light emitted from the cavity is controlled by the optical apparatus within the cavity of FIG. 1 to be described below.

Two lens systems, the first comprising a pair of lenses 20A and 20B, and the other lens system comprising a pair of lenses 21A and 21B are aligned along a common axis 25. The reflecting surfaces 10 and 11 are arranged perpendicular to the axis 25. All of the lenses 20 and 21 are converging type lenses, and have a two dimensional shape similar to a section of a cylinder standing perpendicular to the plane of the drawing of FIG. 1. The drawing in FIG. 1 illustrates a typical cross section of the cavity.

The lens systems 20 and 21 have a common focal plane located at the center of the cavity and designated common focal plane 27. Therefore, parallel rays of light reflected from earlier surface 10 or 11 are converged by the lens systems 20 and 21 onto the plane 27. To illustrate this, the path of a chief ray 30 and adjacent rays 31 and 32 are shown in FIG. 1. The chief ray 30 is reflected from the surfaces 10 and 11 at a pair of points 35 and 36 lying on the intersection of axis 25 and surfaces 10 and 11 respectively. The lenses 20A and 21A have a center of curvature located on the points 35 and 36 respectively as designated by the radii R. Therefore, the chief ray 30 passes through lenses 20A and 21A without refraction.

Following the path of chief ray 30 after it leaves surface 10 and passes through the upper portion of lens 20A, ray 30 is refracted by lens 20B and emerges perpendicular to the common focal plane 27 and parallel to the axis 25. After passing through the lens 21B, it is directed toward the intersection point 36 where it arrives without refraction by lens 21A. After reflection from surface 11, chief 30 ray passes through lens 21A and is refracted by lens 21B into a path perpendicular to common focal plane 27 and parallel to axis 25. Lens 20B refracts ray 30 and directs it through lens 20A to intersection point 35 where it is reflected and passed through lens 20A once again thereby forming a closed loop path within the cavity of FIG. 1.

Rays 31 and 32 are parallel to chief ray 30 inside the lasers 14 and 15. After passing through lenses 20A and 21A, rays 31 and 32 converge on lenses 20B and 21B. Lenses 20B and 21B cause further convergence of rays 31 and 32 and also alter their direction so that focusing is accomplished at a pair of points 38 and 39 on the common focal plane 27.

Other sets of parallel rays reflecting from surfaces 10 and 11 at angles different from rays 31 and 32 are converged by lenses 20 and 21 on the focal plane 27 at points other than 38 and 39. Due to the action of lens systems 20 and 21, light diverging from each point on the common focal plane 27 results in a corresponding set of parallel rays striking the reflecting surfaces 10 and 11 and reconverging at another point on the plane 27.

The laser light emitted by oscillations along the path of chief ray 30 passes through the reflecting surface 11 which is a conventional partially transmitting type of reflecting surface. The laser emission from the cavity is shown in the form of broken line rays 31' and 32' which have the characteristic high coherency and directivity of laser beams.

The direction of the laser beams 31' and 32' can be varied by changing the preferred mode of oscillation to focal points on plane 27 other than 38 and 39. This is accomplished by a group of optical components consisting of a pair of polarizers 40 and 41, a Kerr cell 43 and a Babinet compensator 45. The polarizers 40 and 41 are aligned with their polarization axis in the same direction. The Kerr cell 43 introduces a phase delay between two orthogonal components of the linearly polarized light passing therethrough. The degree of phase delay can be varied by a variable source of potential 47. Compensator 45 introduces a phase delay in the light passing therethrough which tends to compensate for the delay introduced by the Kerr cell 43. However, the compensator 45 effectively cancels the phase delay only at two points, for example, 38 and 39. At all other points, the phase delay of the light after passing through the compensator 45 is not fully compensated by compensator 45. Therefore, the polarizers 40 and 41 tend to attenuate light diverging from all points on the common focal point 27 except points 38 and 39.

To illustrate the operation of the optical components 40, 41, 43 and 45, the phase delay which chief ray 30 undergoes during a complete loop of the cavity is explained. Beginning at the point of intersection 35, light traveling along chief ray 30 through the upper portion of lens 20A arrives at polarizer 40 and is polarized in a certain direction corresponding to the axis of polarization of polarizer 40. After passing through the upper portion of Kerr cell 43, a phase delay is introduced, the amount of which is determined by the setting of source 47. At the point 38, compensator 45 introduces a phase delay which exactly cancels the phase delay introduced by Kerr cell 43. Above this focal point, the compensator 45 introduces too large a phase delay, while below this focal point the compensator introduces too little phase delay. Since the angle of polarization of polarizer 41 is the same as polarizer 40, only rays 31 and 32 pass through polarizer 41 with little or no attenuation. All other rays diverging from points other than 38 have phase delays between their orthogonal components. Polarizer 41 acts as an analyzer diminishing the intensity of rays other than 31 and 32 passing only a portion of the light energy.

The rays 31 and 32 are reflected by surface 11 and returned to the lower portion of polarizer 41. They pass once again with little or no attenuation and converge at point 39. Compensator 45 introduces a phase delay. This phase delay introduced by the lower portion of compensator 45 at point 39 is exactly the same as the phase delay introduced by the upper portion at point 38 due to the symmetry in construction of the compensator 45 about the axis 25. Therefore, the phase delay introduced by the lower portion of the compensator 45 at point 39 is exactly compensated for by the phase delay introduced by Kerr cell 43. In this manner, rays 31 and 32 arrive at the lower portion of polarizer 40 in exact alignment with the polarization angle of polarizer 40. All rays diverging from points other than 39 do not have their orthogonal components in place and are accordingly attenuated.

In this manner, the path of chief ray 30 is set up as the preferred mode of oscillation having the highest degree of resonance, or Q, within the cavity of FIG. 1. Accordingly, emission takes place along this mode in preference to all other possible modes of oscillation. Variation of the voltage on source 47 causes a change in the effect of Kerr cell 43 and a corresponding change in the location in compensator 45 where exact cancellation takes place. A new preferred mode of oscillation is set up and a laser emission occurs through the partially transmitting reflecting surface 11 at a new angle.

While the invention has been described following a clockwise direction about the closed loop path of chief rays 30, the light may travel in either, or both directions about the closed loop path.

For the embodiment shown in FIG. 1 where the lenses 20 and 21 have a two-dimensional shape corresponding to a section of a cylinder, exact compensation occurs in the plane 27 along a pair of lines perpendicular to the plane of FIG. 1, for example, lines including points 38 and 39 and perpendicular to the plane of FIG. 1. Therefore, the output laser beam from surface 11 is in the form of two lines extending in length perpendicular to the plane of the drawing of FIG. 1. Control of the direction of the beam is only one dimensional, that is, the angle about the axis 25 may be varied. For two dimensional control of the beam spherical lenses having the cross-sectional shape of lenses 20 and 21 may be employed. A second Kerr cell is added and arranged in a position corresponding to a 90° rotation of Kerr cell 43 about axis 25. Also, another Babinet compensator is added adjacent to compensator 45 and arranged in a position coresponding to a 90° rotation of compensator 45 about the axis 25. Operation of the additional Kerr cell and compensator is exactly the same as Kerr cells 43 and 45 so that the coincident compensation of the two Kerr cells with two Babinet compensators occurs at two points, instead of two lines. Therefore, the output laser beam is in the form of a pair of narrow beams which may be controlled in two dimensional fashion. Other suitable lens systems for this two dimensional embodiment of the invention may be found in commonly assigned concurrently filed application Serial No. 511,775, now U.S. Patent No. 3,433,558.

While the optical devices for controlling the direction of emission are shown to be Kerr cell 43 and Babinet compensator 45, other control devices are disclosed in the above co-pending applications. Also, emission can be achieved through the use of only a single laser located anywhere between the two reflecting surfaces 10 and 11 with the use of appropriate lens systems as described above.

It is apparent from the above description that the laser light is not focused on the reflecting surfaces 10 and 11. The only focusing of light occurs in the plane 27 where the compensator 45 is located. Since the compensator 45 is transparent, little absorption occurs, and a correspondingly small or negligible amount of heat is generated therein. Further, the compensator 45 is composed of materials capable of withstanding the high electric fields of the coherent light. Also, due to the flat geometry of the common focal plane 27, a conventionally shaped Babinet compensator 45 requiring no curved surfaces may be employed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A laser cavity comprising:
a pair of plane mirrors located parallel to each other at opposite ends of said cavity;
at least one active laser element located between said mirrors for producing stimulated emission of light in a plurality of paths of oscillation in said cavity;
a pair of lens systems positioned between said mirrors in said light paths and having a common focal plane located between said systems; and
laser emission control means including means located in said common focal plane for setting up preferred ones of said paths of oscillation within said cavity.

2. A laser cavity comprising:
a pair of plane mirrors located parallel to each other at opposite ends of said cavity;
at least one active laser element located between said mirrors for producing stimulated emission of light in a plurality of paths of oscillation in said cavity;
a pair of lens systems positioned between said mirrors in said light paths and having a common focal plane located between said systems, and each said lens system refracting rays diverging from said common focal plane into parallel rays; and
laser emission control means including means located in said common focal plane for setting up preferred ones of said paths of oscillation within said cavity.

3. A laser cavity comprising:
a pair of plane mirrors arranged parallel to one another;
at least one active laser element loacted between said mirrors for producing stimulated emission of light in a plurality of paths of oscillation in said cavity;
a pair of lens systems positioned between said mirrors in said light paths and having a common focal plane located between said systems and parallel to said mirrors; and
laser emission control means including means located in said common focal plane for setting up preferred ones of said paths of oscillation within said cavity.

4. A laser cavity comprising:
a pair of plane mirrors arranged parallel to one another;
at least one active element located between said mirrors for producing stimulated emission of light in a plurality of paths of oscillation in said cavity;
a pair of lens systems positioned between said mirrors and having a common focal plane located between said systems and parallel to said mirrors; and
laser emission control means including a compensator located in said common focal plane and a variable birefringement element located between said mirrors in said light paths for setting up preferred ones of said paths of oscillation within said cavity.

5. A laser cavity comprising:
a pair of plane mirrors arranged parallel to one another;
at least one active laser element located between said mirrors for producing stimulated emission of light in a plurality of paths of oscillation in said cavity;
a pair of lens systems positioned between said mirrors in said light paths and having a common axis arranged perpendicular to said mirrors and having a common focal plane located between said systems and parallel to said mirrors; and
laser emission control means in said light paths including a compensator having optical properties symmetrical about said axis for setting up a preferred closed loop path of oscillation symmetrical about said axis.

6. A laser cavity comprising:
a first and a second plane mirror arranged parallel to one another;
at least one active element located between said mirrors for producing stimulated emission of light in a plurality of paths of oscillation in said cavity;
a first, a second, a third, and a fourth converging lens in said light paths having a common axis perpendicular to said mirrors, the center of curvature of said first and fourth lenses being located at the intersection of said axis and said first and second mirrors respectively, said first and fourth lenses having a common focal plane located between said second and third lenses perpendicular to said axis, and said second and third lenses having focal planes coinciding with the plane of said first and second mirrors respectively; and
laser emission control means in said light paths including means located in said common local plane for setting up preferred ones of said paths of oscillation within said cavity.

7. A laser cavity comprising:
a first and a second plane mirror arranged parallel to one another;
at least one active element located between said mirrors for producing stimulated emission of light in a plurality of paths of oscillation in said cavity;
a first, a second, a third, and a fourth converging lens in said light paths having a common axis perpendicular to said mirrors, the center of curvature of said first and fourth lenses being located at the intersection of said axis and said first and second mirrors respectively, said first and fourth lenses having a common focal plane located between said second and third lenses perpendicular to said axis, and said second and third lenses having focal planes coinciding with the plane of said first and second mirrors respectively; and
laser emission control means in said light paths including a compensator having optical properties symmetrical about said axis and a variable birefringement element located between said mirror for setting up a closed path of oscillation symmetrical about said axis.

References Cited

UNITED STATES PATENTS 3,432,239   3/1969   Holland.

OTHER REFERENCES

Toraldo di Francia: "On the Theory of Optical Resonators," Optical Masers, Polytechnic Press, Brooklyn N.Y., 1963, pp. 157–70.

JEWELL H. PEDERSEN, Primary Examiner

E. BAUER, Assistant Examiner

U.S. Cl. X.R.

350—14, 50, 150, 202